(12) United States Patent
Miller

(10) Patent No.: US 7,626,143 B2
(45) Date of Patent: Dec. 1, 2009

(54) APPARATUS AND METHOD FOR PROCESSING HOT MELT ADHESIVES

(76) Inventor: Scott Richard Miller, 10845 Shagbark Trail, Roswell, GA (US) 30075

( * ) Notice: Subject to any disclaimer, the term of this patent is extended or adjusted under 35 U.S.C. 154(b) by 762 days.

(21) Appl. No.: 11/059,988

(22) Filed: Feb. 17, 2005

(65) Prior Publication Data

US 2006/0182887 A1    Aug. 17, 2006

(51) Int. Cl.
- B05C 5/04 (2006.01)
- B29B 13/02 (2006.01)
- B67D 5/62 (2006.01)

(52) U.S. Cl. .................... 219/421; 222/146.5

(58) Field of Classification Search .......... 219/420, 219/421, 422, 423, 424, 425, 426, 540, 544; 222/146.5
See application file for complete search history.

(56) References Cited

U.S. PATENT DOCUMENTS

| | | | |
|---|---|---|---|
| 3,332,581 A * | 7/1967 | Eastabrooks | 219/421 |
| 3,531,023 A | 9/1970 | Mercer | |
| 3,758,003 A | 9/1973 | Kautz et al. | |
| 3,876,105 A * | 4/1975 | Kelling | 222/146.5 |
| 3,934,119 A * | 1/1976 | Trenkler | 219/543 |
| 3,964,645 A | 6/1976 | Scholl | |
| 3,976,229 A * | 8/1976 | Jackson | 222/146.5 |
| 4,066,188 A | 1/1978 | Scholl et al. | |
| 4,074,707 A | 2/1978 | Perelman | |
| 4,262,820 A | 4/1981 | Flint | |
| 4,395,968 A | 8/1983 | Wahnschaff et al. | |
| 4,453,867 A | 6/1984 | Sharps | |
| 4,505,669 A | 3/1985 | Rogers | |
| 4,641,764 A | 2/1987 | Faulkner, III | |
| 4,804,110 A | 2/1989 | Sperry et al. | |
| 4,850,425 A | 7/1989 | Anderson | |
| 5,374,120 A | 12/1994 | Possanza et al. | |
| 5,632,919 A | 5/1997 | MacCracken et al. | |
| 5,645,743 A | 7/1997 | Zook | |
| 5,650,083 A | 7/1997 | Bondeson et al. | |
| 5,657,904 A * | 8/1997 | Frates et al. | 222/146.5 |
| 5,715,972 A | 2/1998 | Siddiqui | |

(Continued)

FOREIGN PATENT DOCUMENTS

JP    2000-77167 A  *  3/2000

(Continued)

OTHER PUBLICATIONS

Minco Products, Inc.; Thermofoil(tm) Heaters; Bulletin HS-202(D); Jul. 22, 2004.

(Continued)

*Primary Examiner*—Geoffrey S Evans
(74) *Attorney, Agent, or Firm*—Jason A. Bernstein; Barnes & Thornburg LLP

(57) ABSTRACT

A thermoplastic material processing method and system including an integrated melting, pressurizing and dispensing unit and a regulated feed supply system to improve overall performance by only heating the amount of material needed and minimizing the time it is at raised temperatures. The system includes a compact heat exchanger consisting of a plurality of thin heater plates arranged primarily parallel and spaced closely together to form small spaces therebetween. This puts all thermoplastic material in close proximity with the heated surfaces thus improving the overall melting process. The heat exchanger can include heater plates arranged in a radial or fan orientation and a grid of thin heated fins set within a heated enclosure.

28 Claims, 16 Drawing Sheets

U.S. PATENT DOCUMENTS

| | | | |
|---|---|---|---|
| 5,791,830 A | | 8/1998 | Fort et al. |
| 5,814,790 A | * | 9/1998 | Bondeson et al. ............ 219/421 |
| 5,853,243 A | | 12/1998 | Duggan et al. |
| 5,971,211 A | * | 10/1999 | Farley et al. ............. 222/146.5 |
| 5,974,227 A | | 10/1999 | Schave |
| 5,984,148 A | | 11/1999 | Andel et al. |
| 6,003,732 A | | 12/1999 | Farley et al. |
| 6,046,437 A | * | 4/2000 | Frates ........................ 219/426 |
| 6,056,429 A | | 5/2000 | Duggan et al. |
| 6,093,912 A | | 7/2000 | Potchen |
| 6,129,246 A | | 10/2000 | Metzler |
| 6,175,101 B1 | * | 1/2001 | Miller et al. ................ 219/422 |
| 6,222,166 B1 | | 4/2001 | Lin et al. |
| 6,499,629 B1 | | 12/2002 | Colangelo et al. |
| 6,817,088 B1 | | 11/2004 | Lin |
| 7,221,859 B2 | | 5/2007 | Stumphauzer et al. |
| 7,296,707 B2 | * | 11/2007 | Raines et al. ............... 219/422 |
| 2002/0153623 A1 | | 10/2002 | Gobron et al. |
| 2003/0062384 A1 | | 4/2003 | McGuffey |
| 2003/0080156 A1 | | 5/2003 | Jeter et al. |
| 2003/0116584 A1 | * | 6/2003 | Gutierrez et al. ......... 222/146.1 |
| 2004/0069766 A1 | * | 4/2004 | Haasis et al. ................ 219/433 |
| 2004/0099212 A1 | | 5/2004 | Dirienzo et al. |
| 2007/0205215 A1 | | 9/2007 | Porter et al. |

OTHER PUBLICATIONS

Search Report for International Patent Application No. PCT/US2006/003991; Aug. 31, 2007.

\* cited by examiner

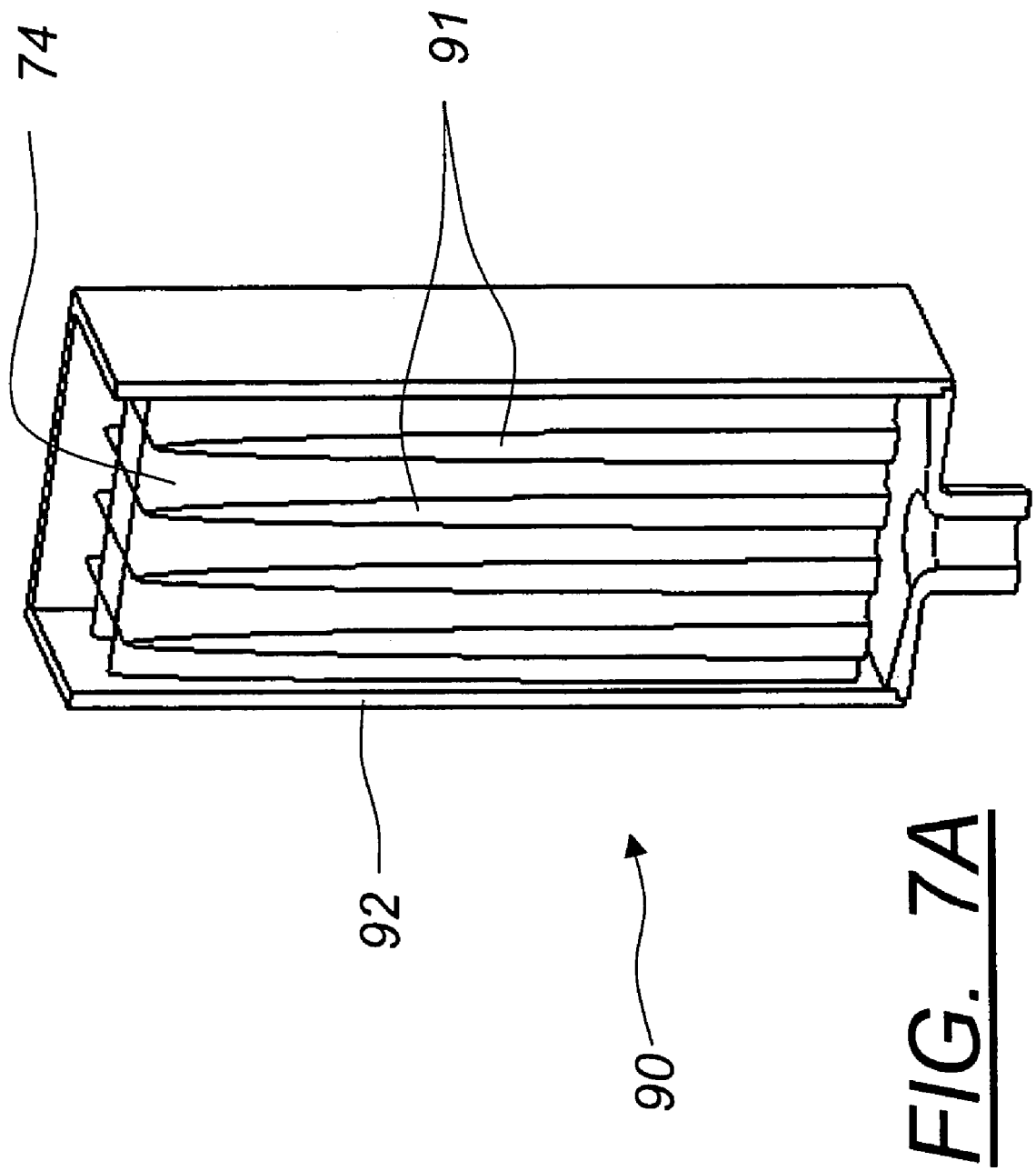

APPARATUS AND METHOD FOR PROCESSING HOT MELT ADHESIVES

FIELD OF THE INVENTION

The present invention relates to an improved method and apparatus for the processing of thermoplastic materials such as thermoplastic adhesives referred to as "hot melt" adhesives. More specifically, the present invention relates to an apparatus that integrates the heat exchanger, pump and dispenser into a single assembly and incorporates a feeding system to regulate solid material. The present invention also relates to a method using the apparatus to process the thermoplastic material.

BACKGROUND OF THE INVENTION

Thermoplastic materials or so-called "hot melt" materials such as adhesives which are used for various coating and bonding operations are usually stored in solid or particulate form and must be converted to the molten state before they can be supplied to dispensers. Thermoplastic processing systems typically used in commercial applications involve melting the material in a large melting unit so that the material is converted to a liquid or flowable material, transporting it at high pressure through one or more heated hoses over considerable distances, and then distributing it to one or more dispensers which apply the liquid adhesive to a substrate material. For the purposes of the present disclosure the terms melt, liquefy and make flowable are referred to as rendering a material able to flow according to desired characteristics. These melting units generally include (1) a hopper (also referred to as a storage vessel or tank) having an opening for receiving solid thermoplastic material, (2) several heating elements mounted within the tank used primarily to convert the solid thermoplastic material to the molten state, (3) a reservoir and/or manifold for receiving the molten material, and (4) a pump for pressurizing and transporting the molten material to the manifold and ultimately off to one or more dispensers. One popular variation to this design is the grid type melter which adds a grid unit that consists of extended fins located within the hopper or tank, and mounted above the reservoir for the purposes of improving the melting capability of the unit. While there have been minor improvements to such systems the basic design architecture has remained the same for many years.

The current system architecture and apparatus designs have many inherent operational shortcomings, which largely come from the use of relatively large often open heated tanks to melt the thermoplastic material and the necessity to transport the molten material over great distances using hoses and/or pipes. The extensive amount of uncovered heated surfaces and pool of molten material inside the tank inherently expose users to serious burn hazards. Also potentially dangerous is the requirement of high pressures to transport the material between the melting unit and the dispensers through heated hoses. The large mass of the tank and its related components necessitate long warm-up time periods resulting in extended system downtimes thus decreasing the productivity of manufacturing lines. Additionally, the large surface area of the tank and its related components allow extensive heat losses resulting in a highly inefficient system that wastes significant energy. Design attributes typical of current systems expose the molten adhesive to air, hold the adhesive at high temperature for long durations, recirculate the adhesive multiple times through the system, and trap adhesive in non-flow areas. These all combine to accelerate the degradation of the thermoplastic material. This often results in charring, which can lodge in the small openings of the dispensing nozzles and cause it to clog unexpectedly. Such clogs are a major source of system failure and system downtime. Furthermore, flexible heated hoses, which are commonly used to transport the molten adhesive from the tank to the dispenser, expand and contract with changing hydraulic pressure thus creating an undesirable system capacitance. Consequently, as the line changes speeds the hose volume changes thus causing inaccurate output flow and therefore variances in material deposition. Finally, the current systems require many and unnecessary large and complex components which make it difficult to locate and install on equipment that has limited space constraints.

It is therefore desirable to have a system that removes many of the safety hazards inherent with current systems, warms up very quickly, eliminates major design attributes that lead to material degradation and thus materially improves system reliability, improves delivery accuracy, consumes significantly less energy, decreases the number of required system components, and reduces the overall size and complexity of the system.

SUMMARY OF THE INVENTION

It is a feature of the present invention to provide a system that overcomes the problems identified with current systems. Instead of utilizing the overall process of melting large amounts of material in an open tank and then pumping the molten material at high pressures through heated hoses to the dispenser, the present invention delivers solid material to the application point where only the amount needed is melted, immediately pressurized, and then fed to the dispenser. This is achieved with a melt unit design that quickly melts the solid material and raises it to the desired application temperature. Unlike current systems, the novel heat exchanger of the present invention works because it successfully overcomes the characteristically low thermal diffusivity properties of thermoplastic material primarily through placing heated surfaces within close proximity to substantially all thermoplastic material. Because the inventive process depends little on the thermal conductivity of the material to heat up the material and only the material needed is heated up at any given time, the material is processed very quickly and within a very compact space envelope. As a result, the melting process can be physically integrated with the dispenser and located at the application point, which typically must fit within relatively tight space envelope. By accomplishing this there is no need to transport the molten adhesive through heated hoses from the melter to the point of application and be subjected to the many disadvantages of the transport hoses.

The novel heat exchanger of one exemplary embodiment of the present invention comprises several thin, closely spaced heater plates that are primarily arranged in a substantially parallel configuration and spaced closely together. The heater plates are fitted inside of a heated shell enclosure composed of a thermally conductive material such as aluminum. Solid thermoplastic material in pellet or other particulate form small enough to fit in the gaps between the heater plates is gravity fed or otherwise directed to the leading edges of the plate. The solid pellets are then heated as they flow downward in between the plates and/or inside wall of the enclosure. By the time the material reaches the bottom of the plates, it is completely liquefied and its temperature is raised to the desired set point temperature.

To provide an ample supply of thermoplastic material the apparatus of the present invention preferably includes a dry hopper that stores particulate thermoplastic material and has a capacity that is sized in accordance with satisfying the operational refilling frequency needs. When a downstream demand signal is received, a measured amount of thermoplastic material is released out of the hopper and transferred into a feed tube or pipe. The material is transferred either by some means such as gravity, pressurized air, vacuum, vibration, other method known to those skilled in the art, or a combination of the aforesaid methods through the feed tube down to the inlet of the heat exchanger unit. A sensor located at the entrance of the heat exchanger determines if there is sufficient amount of thermoplastic material present to maintain proper operation. Insufficient thermoplastic material can cause the system to run dry whereas too much can potentially result in particulate bridging or even upstream melting or sintering. As the thermoplastic material is liquefied within the heat exchanger unit, additional particulate thermoplastic material that has accumulated in front of the heater plates flows down into the heat exchanger. When the amount of particulate material goes below the predetermined amount, a sensor is activated and sends a signal back to the hopper and another measured amount of thermoplastic material is again released. It is preferable to use transparent components for the storage and transporting of solid material. This allows operators to easily see the status of the material supply or determine if the system is operating properly. It is also possible for sensors to be used at various points in the system to automatically monitor the same.

To maximize the heat transfer from the plates and avoid potential degradation of the thermoplastic material, preferably all the surfaces of the plates are maintained at the set point temperature. During normal operation, the leading portions of the heater plate are subjected to the greatest temperature differential due to the inflow of essentially room temperature thermoplastic material. Therefore the greatest thermal loading occurs at the leading edge of the plates and decreases progressively toward the trailing edge. To maintain the desired surface temperature at all points with this differential loading and to minimize the number of temperature control zones, the heater elements are designed with greater watt densities towards the front and progressively decrease towards the back edge commensurate with the heat transfer loading.

During times when the unit is sitting idle and no flow is occurring, the heating demands change significantly in that the heating loads become more evenly distributed. To more effectively handle this condition, the heater plates are preferably divided into multiple temperature control zones. Temperature sensors are located internal to the plates and positioned strategically to be the most responsive to the loading and still maintain the overall surface temperatures as consistent as possible. A two-zoned configuration provides a high level of performance and represents a low cost approach though more than two zone configurations are possible.

The plates are constructed of ultra-thin heater elements, such as graphite, which are sandwiched and bonded in between layers of a highly-thermally conductive material, such as aluminum.

It is preferable to make the heater plates as thin as possible for the purposes of minimizing the cross-sectional area the thermoplastic material is subjected to as it flows into the heat exchanger. Also, a thin plate acts as a hot knife slicing through any thermoplastic material that lands on the front edge of a plate. A thinner plate means that less thermoplastic material that must be displaced via melting to allow the thermoplastic material to progress down in-between the plates. In addition, a thinner plate is less of a flow impediment thus enabling a smoother flow transition to and in between the plates. Furthermore, the thinner the plate, the less mass that must be heated up thus maximizing warm up performance and making the system more responsive to temperature changes resulting from fluctuations in the thermal loads. Finally, thin plates are more conducive to making the overall design sufficiently compact.

Conversely, it is necessary to make the conductive outer sheet sufficiently thick to allow good heat conduction across the plate surface. This avoids potential localized hot spots due to uneven thermal loading as well as preventing gradients between the temperature zones. In addition, the overall composite must also be thick enough to provide adequate structural stiffness and integrity to resist damage.

The enclosure shell that holds the heater plates may have attachment mechanisms, such as slots, to maintain the placement of the heater plates and through holes to pass heater electrical and temperature sensor leads to the outside of the overall enclosure. Thin sheet heater elements are placed in contact with the outer enclosure wall to maintain inside wall temperatures consistent with the internal heater plates. Similar to the plates, heater watt densities are arranged so that the wattage is higher at the material inlet end and progressively decrease towards the outlet end of the heat exchanger in accordance with the thermal loading profile.

The spacing of the heated plate surfaces is important for efficient melting and conveyance of the thermoplastic material. Since hot melt thermoplastic materials have relatively low thermal conductance, they must be in close proximity to a heated surface to be efficiently heated. The closer the plates are spaced, the more effective the heat transfer process. At the same time, though sufficient space between the plates is required to physically allow thermoplastic material to initially flow in between the plates and to not cause excessive friction of the thermoplastic material flow as it progresses through the heat exchanger. Also affecting the heat transfer process is the length of the heaters. The combination of the quantity of heater plates, plate width, plate length, and plate spacing contributes to rate and capability of the overall material throughput of the heat exchanger.

Testing has revealed that the smaller forms of thermoplastic material particulates tend to result in the best performances or the highest melt rates. The primary reason was these particulates could easily fall in between the plates without having to first rely on some degree of melting at the leading edge of the heater plates. The adhesives with good results were H.B. Fuller's PHC7002 and Henkel Adhesive's Techomelt Lowmelt 80-8748, which both come in a form referred to as pastilles. Typical of these pastille particles were round shapes of approximately ⅛" in diameter or discus shapes with a 0.2" diameter and a thickness of 0.1".

The exterior of the heat exchanger enclosure is preferably covered with a solid insulating material that serves multiple purposes. One function is to hold the heater elements in good contact with the outside surface of the enclosure thus providing good thermal communication. Another purpose is to minimize the heat losses which reduces the power requirements. Yet another purpose is to provide a protective surface that prevents serious burns in the case of incidental contact by a user.

At the outlet of the heat exchanger the thermoplastic material is immediately directed towards a pressurizing device such as a gear or piston pump. Typical pumps are standalone devices that interface with the tanks and/or manifolds. The pump structure of the present invention incorporates the features of a distribution manifold, thus accomplishing the pump and manifold functions with fewer components. In one exemplary embodiment the pump comprises three major plates: drive, center, and module plates. In another embodiment, the pump comprises two plates. The module plate serves as the interface for the one or more dispensers used and thus incorporate the fluid ports, air actuation ports for dispensers that rely upon compressed air to actuate them, and dispenser mounting provisions. Other related functions such as filtration and pressure relief can also be incorporated within one of the plates. By utilizing this approach, the number of hydraulic interfaces involving high-pressure sealing is reduced, which simplifies the design and improves safety. Also, the fluid flow paths are short and direct which minimizes the adhesive volume and any pressure drops incurred when the fluid is flowing.

BRIEF DESCRIPTION OF THE DRAWINGS

FIG. 7A is an isometric cross-section view of the melt unit showing the arrangement of the fins within an alternative grid heat exchanger configuration with fins in two directions.

DETAILED DESCRIPTION OF THE DRAWINGS

The term "solid" regarding the thermoplastic material is intended to include, but is not limited to, particles, spheres or other regular or irregular geometric shape, granules, flakes, rods, pellets, pastilles, pillows, blocks, threads, grains, mixtures and combinations thereof and the like.

Figure 1:
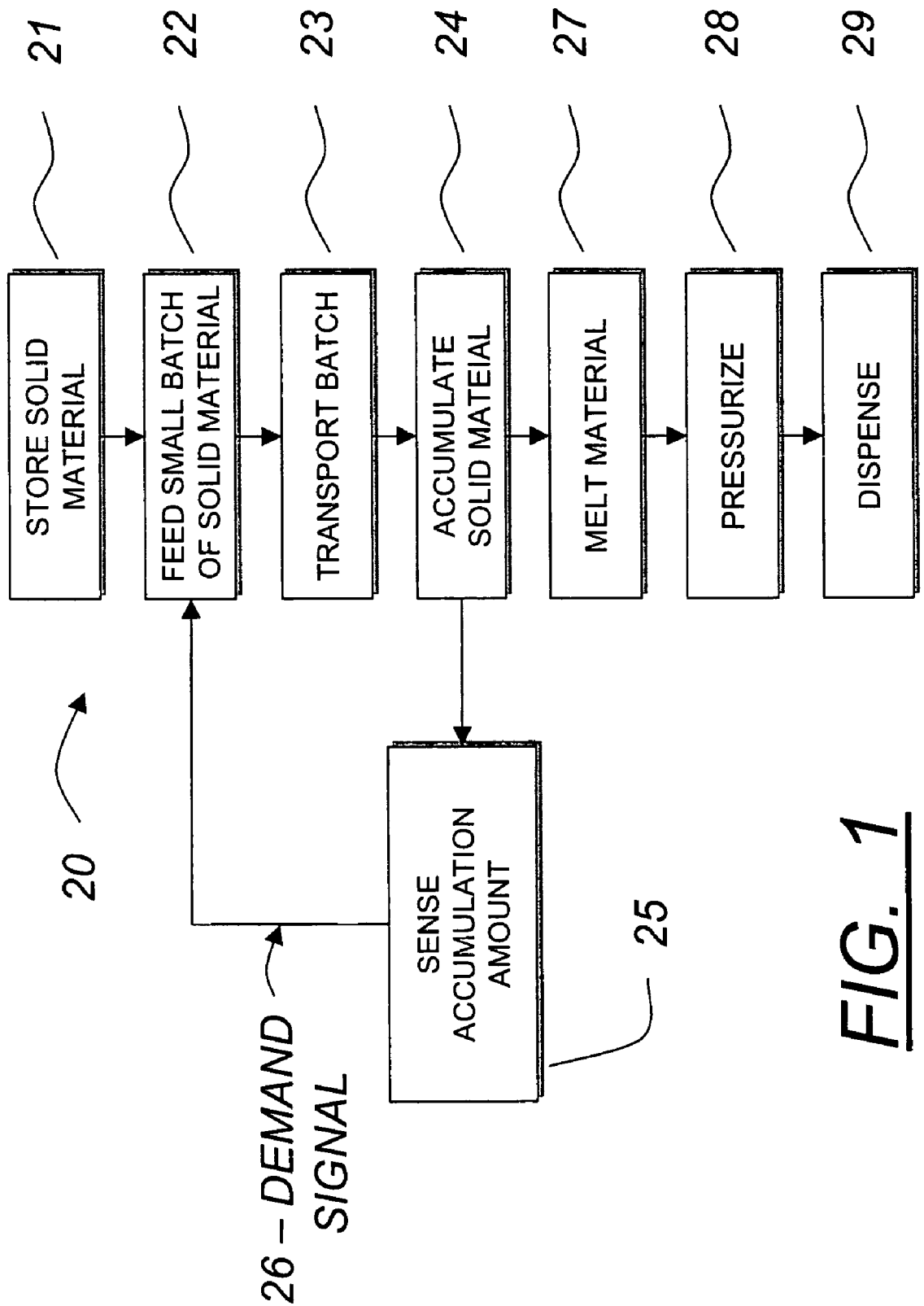
FIG. 1 is a flow diagram of an exemplary method to process thermoplastic materials.

FIG. 1 shows a flow diagram of a method 20 according to an exemplary embodiment of the present invention for processing thermoplastic materials that allows the thermoplastic material to be melted at the last possible moment and held at high temperatures for the least possible time. The solid material is stored (block 21) in a location easily reached by system operators and in adequate amounts to minimize refill frequency. A small batch of solid material representing a measured amount of material is then fed upon demand (block 22). The batch is transported (block 23) in an easily conveyable solid form from the storage location to the point of application, which is typically difficult to access during normal operation. Solid material is accumulated (block 24), which is done to provide a minimum supply of material to just keep the system fed. At this location, it is preferable to sense the accumulation amount (block 25) to be sure there is ample material but not an excessive amount. The information from sensing the material accumulation is communicated back to the feed small batch of solid material (block 22) via a demand signal (block 26). This accumulation is preferable to properly regulate the subsequent melting step of the material (block 27), which is strategically located near the point of application. This minimizes the amount of material that must be held in liquid form and therefore minimizes the time the material is held at the high temperatures that lead to material degradation. Once the thermoplastic material is molten, the fluid is pressurized (block 28) to pressures suitable to allow good flow characteristics. The molten material is then dispensed (block 29) onto a substrate or otherwise provided for use for the intended application. It is also possible that instead of immediately dispensing the material out of a valve (known to those skilled in the art as a module), it transfers the molten material through a "heated transfer pipe" to another small manifold which houses the dispensing valve. The reason for this heated transfer pipe is to transfer material into the application area where space is very limited or the location of the melt section and drive must be out of the way.

Figure 2:
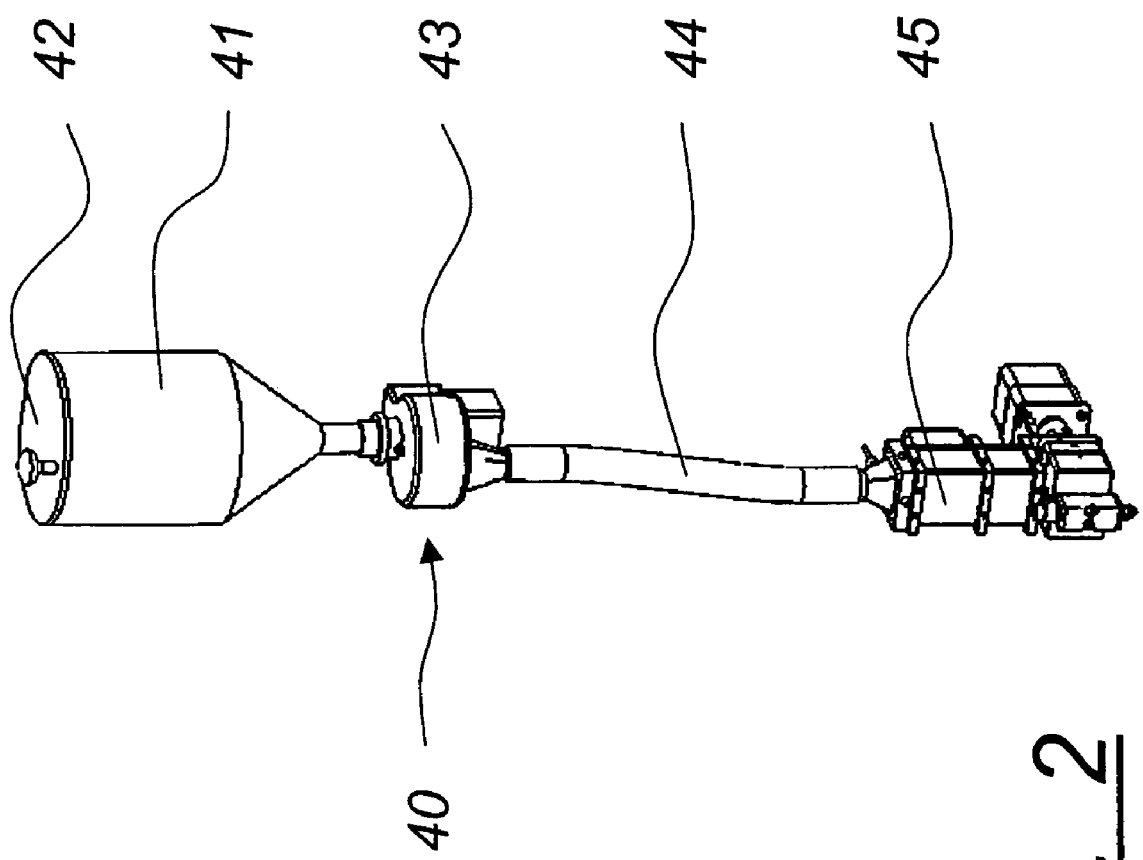
FIG. 2 is an isometric view of a single dispenser thermoplastic processing apparatus according to one exemplary embodiment of the present invention.

Referring to FIG. 2, which shows one exemplary embodiment of an apparatus 40 according to the present invention, which may be used in various capacities for processing different types of thermoplastic material and in particular is especially useful for processing hot melt adhesives. The apparatus 40 consists of several major subsystem components or subassemblies. A hopper or storage vessel 41 stores a supply of solid hot melt material, which may be introduced by opening a cover or lid 42 which is preferably hinged (the hinge, though not shown, is conventional and known to those skilled in the art). The solid material is then fed to a feeder unit 43, which receives the solid material and then upon demand from downstream processes parcels out measured amounts of material to a flexible feed hose 44. Material travels through the flexible feed hose 44 until it reaches a melt unit 45. Within the melt unit 45, the solid material is melted, pressurized, and dispensed as needed. Optionally, the hopper 41 has a filter or sieve 41A (not shown) disposed therein (such as sitting on tabs extending inwardly from the inside walls of the hopper 41) for filtering out foreign objects or clumps of particles too large to be processed which could otherwise jam the operation of the apparatus.

Figure 3:
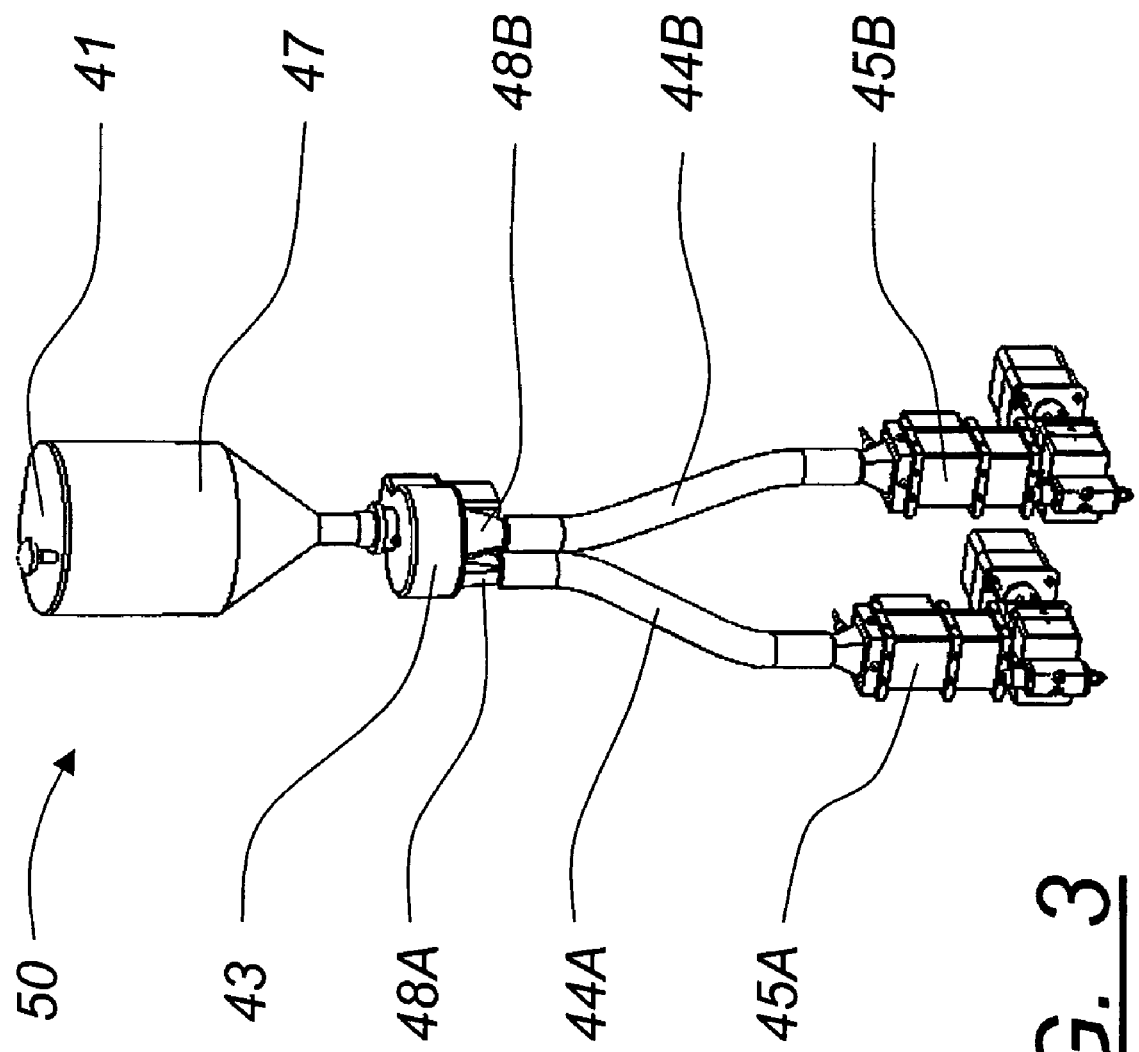
FIG. 3 is an isometric view of a dual dispenser thermoplastic processing apparatus according to an alternative exemplary embodiment.

Similarly, FIG. 3 depicts an alternative exemplary embodiment of a melt apparatus 50 having dual melt units 45A, B to process thermoplastic materials. A hopper 47 is used to store material. The hopper 47 incorporates a hinged cover or lid 42 through which solid material is introduced. Material flows out of the hopper 47 to the feeder 43 which features two separate discharge outputs 48A, B. Similar to the single melt unit embodiment described hereinabove, the flexible hoses 44A, B feed materials into the melting units 45A, B where the material is melted, pressurized and dispensed as needed.

Figure 4:
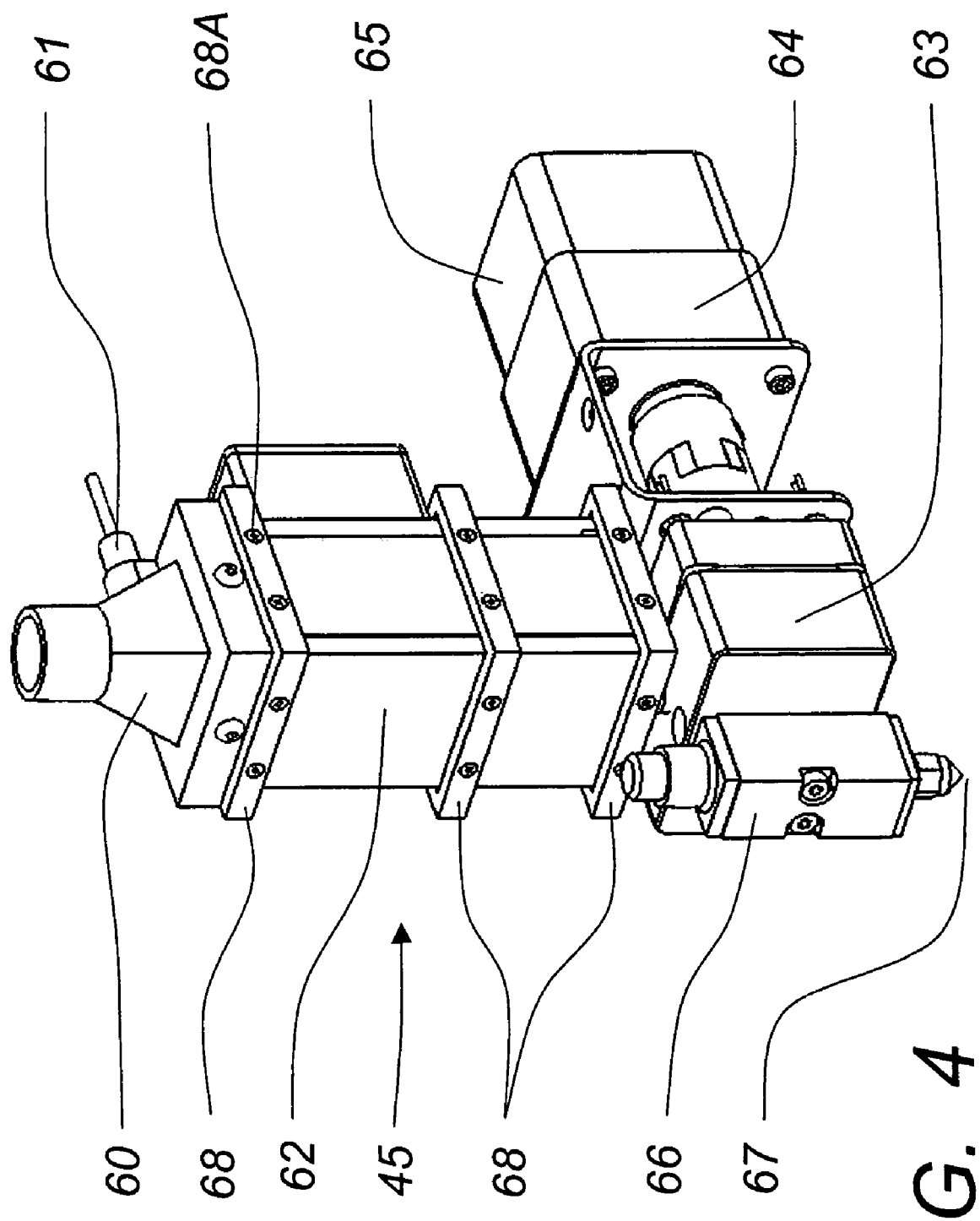
FIG. 4 is an isometric view of the lower portion of an exemplary thermoplastic processing apparatus.

FIG. 4 illustrates the lower portion of the apparatus 40 in greater detail, which includes the melt unit 45. Material is transported into the melt unit 45 through a cap 60. Within this area a "presence" sensor 61 is utilized to sense the height of accumulated particulate material. One suitable sensor is a light beam sensing (i.e., photoelectric) sensor, such as an object-reflecting switch (e.g., available from Omron (Schaumburg, Ill.) as Photoelectric Switch, Model E35-DSS E2). Another type of sensor is a reflector switch or a two-piece switch, both of which are known to those skilled in the art and are commercially available. Located beneath the cap 60 is a heat exchanger 62 whose function is to bring the thermoplastic material up to the required temperature.

After fully heated, the material is transferred to a manifold/pump 63, which integrates both the function of pressurizing the material and distributing it. The pressurizing device may be any conventional type of commercially suitable pump known to those skilled in the art, such as, but not limited to, a rotating gear pump (not shown in FIG. 4, but is described in greater detail hereinbelow). Coupled to the manifold/pump 63 is a gearbox 64 which reduces the rotational speed of a drive motor 65 coupled thereto. The drive motor 65 may be any appropriate driving mechanism of which a drive motor is only one example. At least one gear is operatively associated with the drive motor as is described in greater detail hereinbelow with respect to FIG. 9A. Molten material is internally transferred from the manifold/pump 63 to a dispenser 66, which controls the application of material. Material flows out of a nozzle 67 for the intended application when the dispenser 66 is activated in a conventional manner. One or more clamps 68 are preferably used and attached to the heat exchanger 62 via fasteners 68A so as to secure the apparatus 45.

Figure 5:
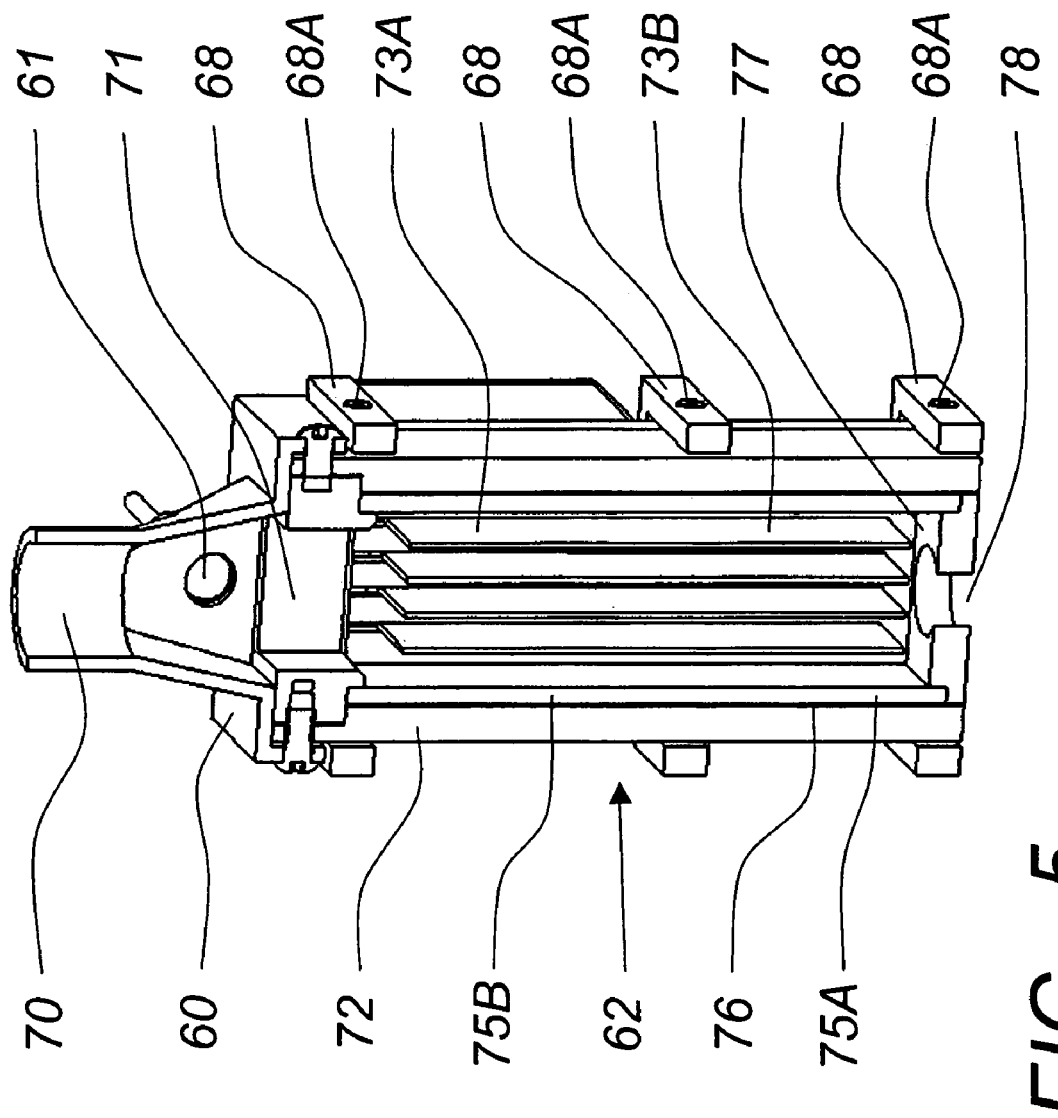
FIG. 5 is an isometric cross-section view of the melt unit showing the internal arrangement of the heat exchanger unit and the heater plates.

FIG. 5 illustrates the internal construction of the heat exchanger unit 62 and cap 60. Solid material is introduced through the cap 60 into a material inlet area 70. Material is allowed to build up in an accumulation section 71 up to a height that is sensed by the level sensor 61. The sensor 61 has appropriate lead(s) connecting it to a processor (not shown) in a conventional manner. This accumulation section 71 is defined by the inside walls of the cap 60 and thermal insulation 72 and the space above one and preferably a plurality of heater plates 73. Each heater plate 73 has an upper portion 73A and a lower portion 73B. Solid particles of material accumulate at the inlet to be funneled into the gaps 74 in between the heater plates 73 and the inside walls 75A of a housing or enclosure 75. The melted flowable material flows downwards and is heated by the surfaces of the heater plates 73 and the inside wall of the enclosure 75. It is preferable to maintain the level of flowable material above the top edge of the plates 73; it is further preferable to keep the level of flowable material to be no more than about ¾ inch (about 1.9 cm) (more preferably ½ inch, about 1.27 cm) above the top edge of the plates.

Each of these heater plates 73 is composed of material with high thermal conductivity, such as, but not limited to, a conductive graphite-based heater element electrically insulated with a thin KAPTON® polyimide film sheet (available from DuPont High Performance Films, Circleville, Ohio) on both sides. Two (or more) thin sheets of aluminum (or other heat conducting material may be bonded to both sides of this heater to form an overall laminate. In one exemplary embodiment the plate 73 comprises a layer of graphite laminated between two sheets (or strips) of KAPTON® film. This laminate is then laminated between two sheets two sheets (or strips) of, for example, aluminum. Optionally, the thermally conductive layer is coated with a nonstick coating. Other manufacturers offer similar products referred to as flexible heater that use either foil or wire wound elements encased in Kapton. The enclosure 75 may be constructed of graphite laminated between two layers of KAPTON®. The heater plates 73 each preferably have a thickness of less than or equal to about 0.2", and, more preferably, less than or equal to about 0.04".

On the outside walls 75B of the enclosure 75 are enclosure heaters 76. Outside of these heaters 76 is the thermal insulation 72 to minimize the heat losses and provide protection from the hot metal surfaces and heaters. As the thermoplastic material reaches the lower ends 73B of the heater plates 73, the material is fully molten and its temperature has been raised to the desired setpoint. Molten material is accumulated at a collection area 77 at the bottom of the heat exchanger unit 62. Fluid is then able to flow out via an outlet 78. The bottom edge of the heater plates 73 may be fitted within slots (not shown) in the enclosure 75 and attached thereto, such as by friction fit or by bolts, welding, adhesive, or other conventional attachment means.

Figure 6:
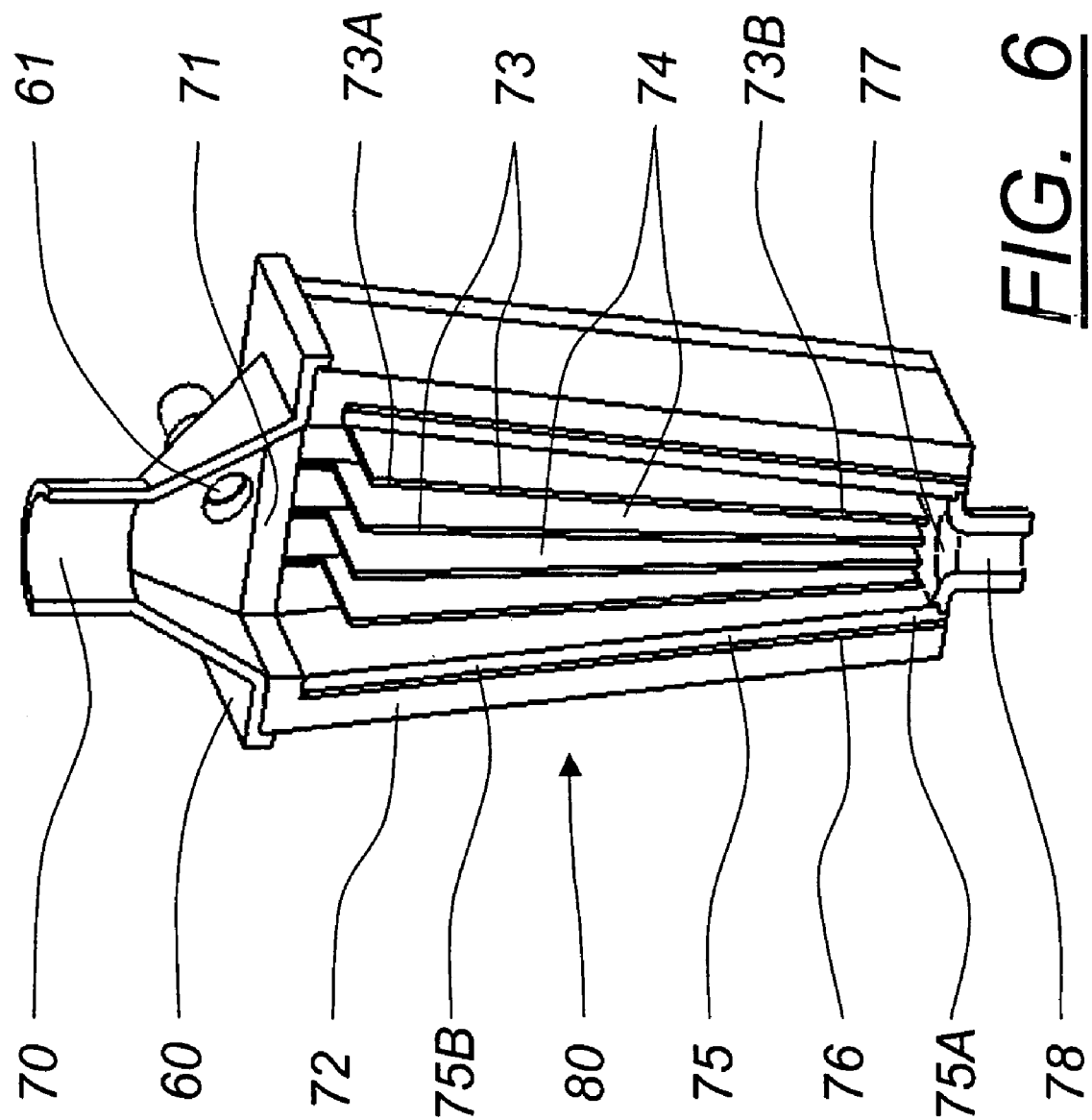
FIG. 6 is an isometric cross-section view of the melt unit showing the arrangement of the internal heater plates in an alternative fan orientation.

FIG. 6 shows an alternative exemplary embodiment of a heat exchanger unit 80 in which the heater plates 73 are in a fanned arrangement instead of parallel. A design feature of this embodiment is to create wider gaps 74 at the top or leading edge 73A so that solid material may flow more easily into the heat exchanger section and narrower gaps at the lower portion 73B to insure there is adequate heat transfer to allow the material to reach the desired final temperature.

FIG. 7A shows yet another alternative exemplary embodiment of a heater plate-based heat exchanger 90 in which heated fins 91 are used to transfer heat to the thermoplastic material. These heated fins 91 are arranged in a two-dimensional grid or array arrangement in order to provide improved heat transfer to the fins and to provide adequate heat transfer surface area in contact with the material to be melted. A grid may be defined as two groups of fins, each group comprising substantially parallel fins (of either uniform or non-uniform thicknesses) in which the extended portions all point in the same direction but their respective bases are oriented in at substantially right angles (alternatively, acute or obtuse angles can be used, such as in a diamond (rhomboid) cross-sectional design is used). Thus their intersection essentially forms a two-dimensional grid when taken normal to the direction the fins extend. Similarly, the material is melted and brought up to temperature in the gaps 74 that are formed in between the heated fins 91. An enclosure 92, which is heated by conventional means, is utilized to house the heated fins 91 and is their source of heat. The fins 91 may be formed as part of the enclosure 92 or attached thereto. The fins 91 are preferably made of a thermally conductive material, such as, but not limited to, aluminum or the like, as discussed hereinabove.

Figure 7B:
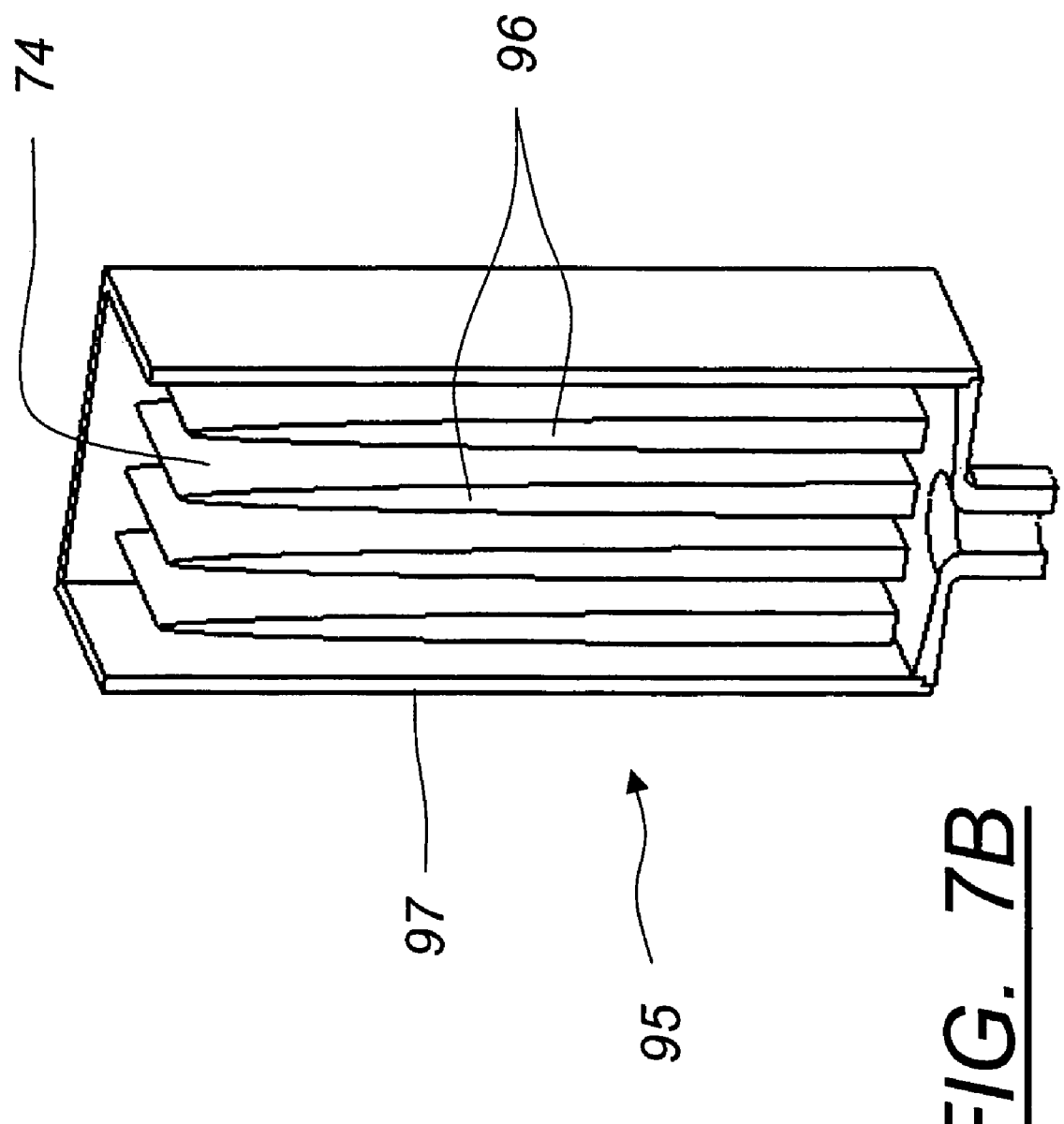
FIG. 7B is an isometric cross-section view of the melt unit showing the arrangement of the fins within an alternative grid heat exchanger configuration with fins in one direction.

FIG. 7B shows an alternative exemplary grid heat exchanger unit 95 that is similar to the heat exchanger unit 90 described hereinabove with respect to FIG. 7A but which has heated fins 96 arranged in a single direction only arrangement (i.e., not a grid). These fins 96 are also heated through the enclosure 97.

Figure 8:
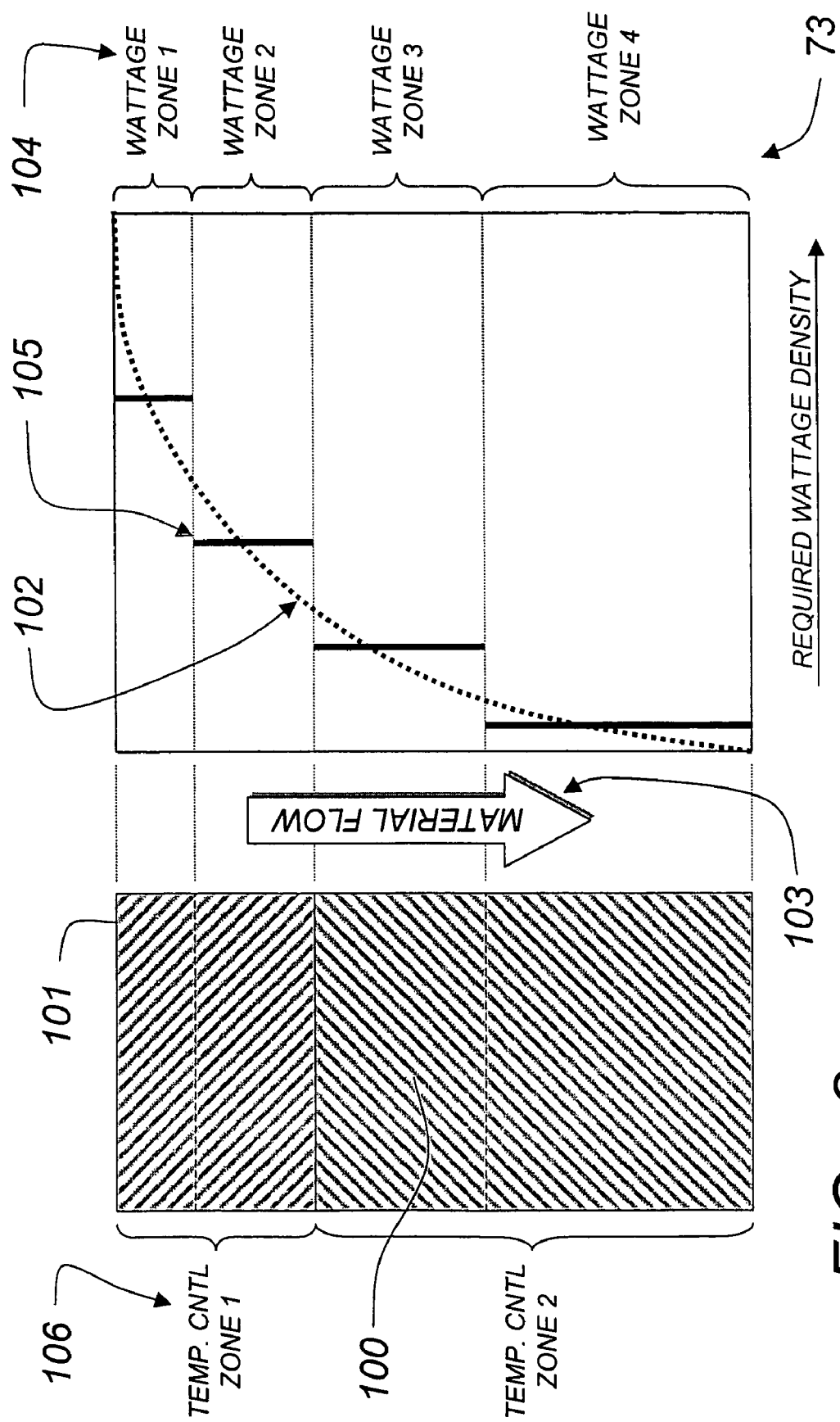
FIG. 8 is a chart showing the wattage density relationships and temperature controls zones within the heater plates in one exemplary embodiment.

FIG. 8 schematically illustrates an exemplary configuration of a heater plate 73. A preferred mode of operation is to maintain the heater plate 73 outside surface temperature at the desired final thermoplastic material operating point. Because the differential temperatures of the thermoplastic material versus the heater plate surfaces 100 are the greatest at the leading edge 101 of the plates, greater heat is required at this point. This required heat decreases in a preferably non-linear relationship (see dotted curve 102) along the heater plate 73 length in the direction of material flow (see arrow 103), which means that the wattage required approaches zero faster than a linear rate. Accordingly, the heater wattage is sized to provide optimal performance. In one exemplary embodiment, the relationship between the wattage densities versus the distance along the plate is nonlinear and preferably in a form consistent with that of a classic first order physical system responding to a step input. The defining formula for such behavior may be in the form of $C(1-e^{-t/\tau})$, where C is a constant, t is time (proportional to the distance along the plate path) and $\tau$ is a time constant. In one exemplary embodiment, the wattage density is a smooth gradient along the plate. In another exemplary embodiment, the wattage density varies in a step function along the plate to practically approximate the defining density function, i.e., there are zones of uniform wattage density 104 next to zones of a different but uniform wattage density values (shown as bars 105). While it is preferable that the wattage density zones are associated with the temperature control zones, this is not mandatory. To optimize the temperature control, it is preferred to use multiple temperature control zones 106. It is further preferable, though not mandatory, to limit the individually controlled temperature zones to two in order to minimize system costs.

Figure 9A:
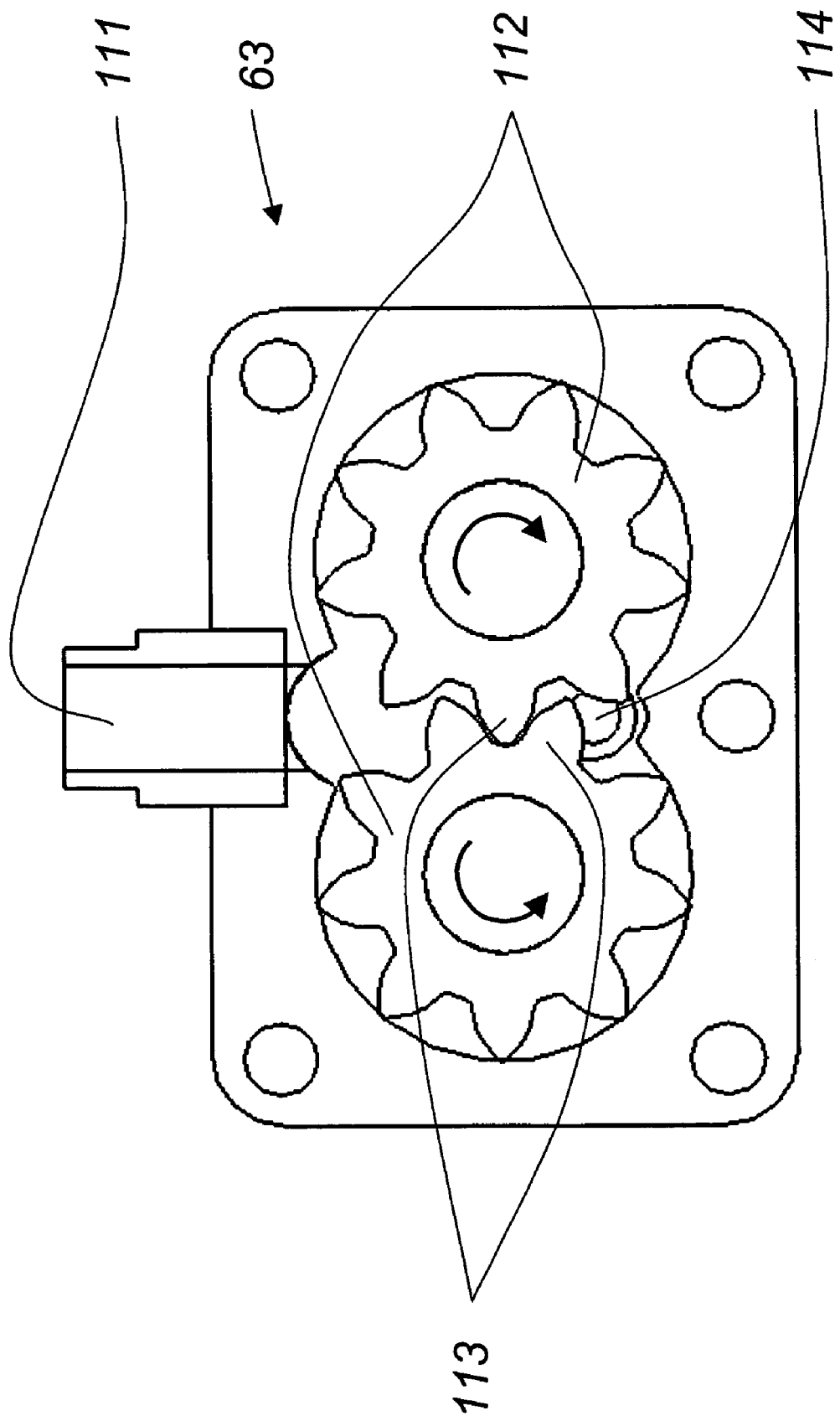
FIG. 9A is a section view of the combination pump-manifold according to one exemplary embodiment showing the internal flow path for the fluid.

FIG. 9A illustrates a detail view of an exemplary integrated manifold/pump 63 whose primary function is to receive the molten adhesive, pressurize it and distribute it to the various dispensers. It is to be understood that this manifold/pump 63 can be used with other flowable materials and within other apparatus. Molten material enters in from the inlet passage 111 located on the top side of the manifold/pump 63. Material is then pressurized through the action of preferably a rotary pump mechanism, an illustrative nonexhaustive example of which is a pair rotating spur gears 112A, B which rotate in the direction shown by the arrows. Fluid squeezed out by the intermeshing gear teeth 113 force material into the outlet chamber 114. Alternatively, other types of gears known to those skilled in the art may be used, such as, but not limited to, lobes, rotors, screws, vanes, and the like.

A pressure relief mechanism is preferably incorporated to protect against overpressurization of the flowable material. One exemplary embodiment of such a mechanism is a pressure relief valve (not shown), as is known to those skilled in the art. Alternatively, another exemplary relief mechanism is for the gears 112A, B to have abnormally large gear clearance which allow significant internal leakage at higher pressures, thus providing a certain amount of self-regulation.

Figure 9B:
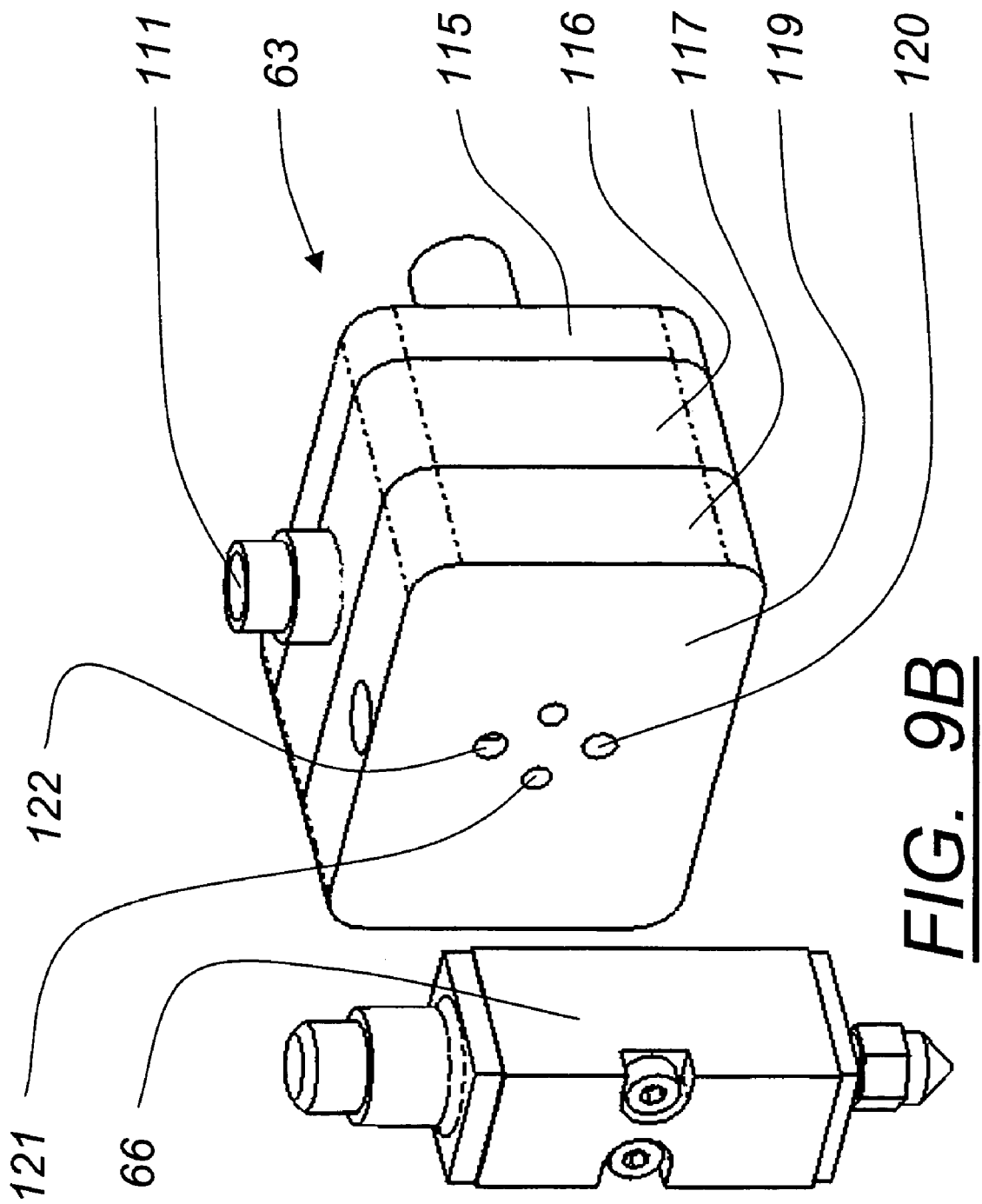
FIG. 9B is an isometric view of the pump-manifold assembly of FIG. 9A.

FIG. 9B also shows one exemplary embodiment of the integrated manifold/pump 63 as having three major plates, namely, a drive plate 115, center plate 116, and module plate 117, as is known to those skilled in the art. In another exemplary embodiment the manifold/pump 63 can have only two major plates, namely the drive plate 115 and a module plate 117, the module plate combining the center plate and module plate. All connections to the dispensers 66 are made via the outside face 119. Fluid is provided through the fluid outlet 120. Provisions to mount the dispenser 66 to the manifold/pump 63 are provided with through the dispenser mounting holes 121. Also located on the outside face 119 is an actuation air port 122 which provides pressurized air used to open and close the dispenser 66. In one exemplary embodiment, actuation air is brought into the gear pump plate from an electrically actuated solenoid. The air is then routed through the plate and exits at the interface of the dispenser, thus allowing air to flow into it. Alternatively, an electric signal rather than air can be used to actuate the dispenser 66.

Figure 10A:
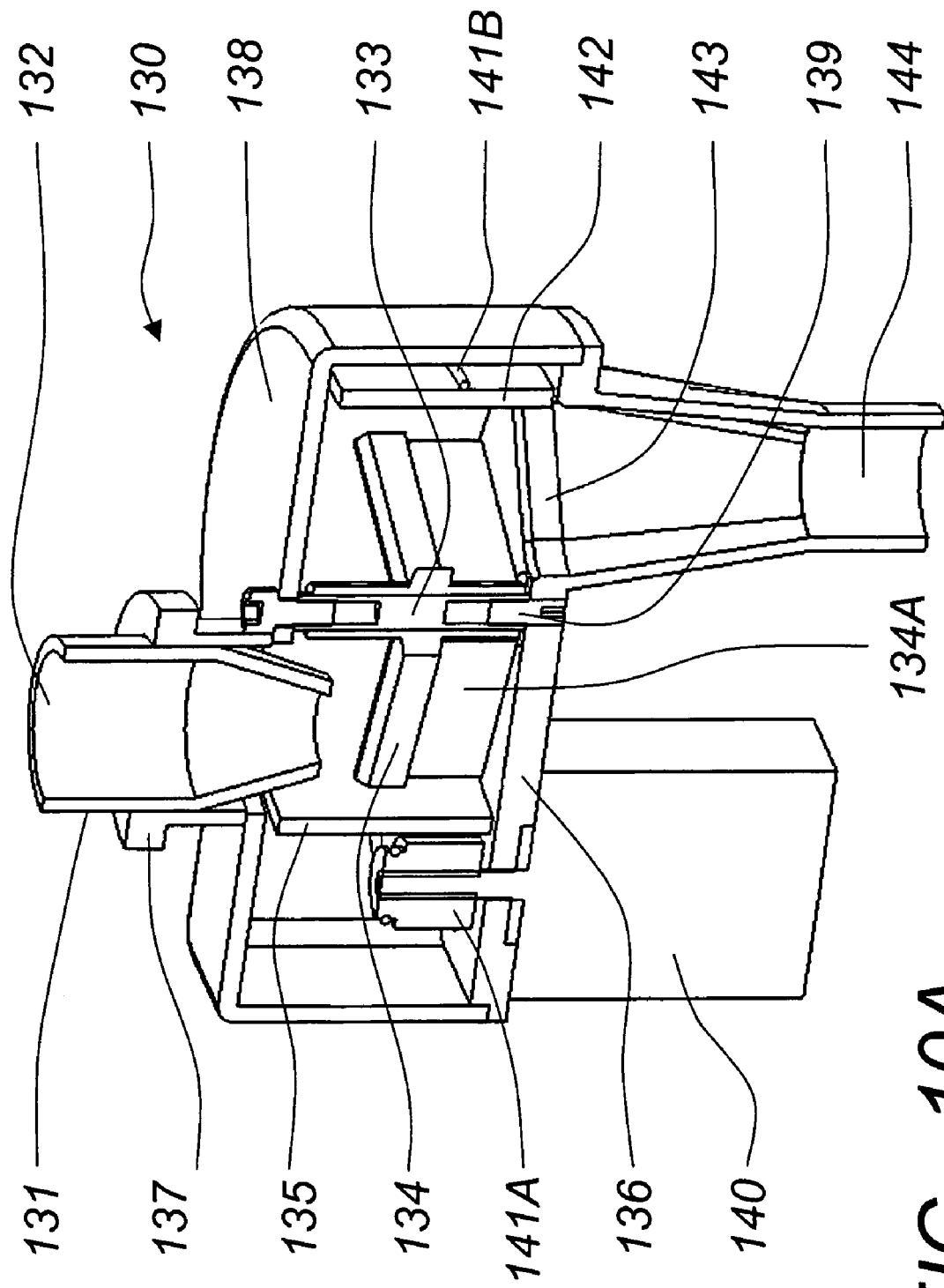
FIG. 10A is an isometric cross-section view of a feeder unit according to one exemplary embodiment having a single aperture and discharge area.
Figure 10B:
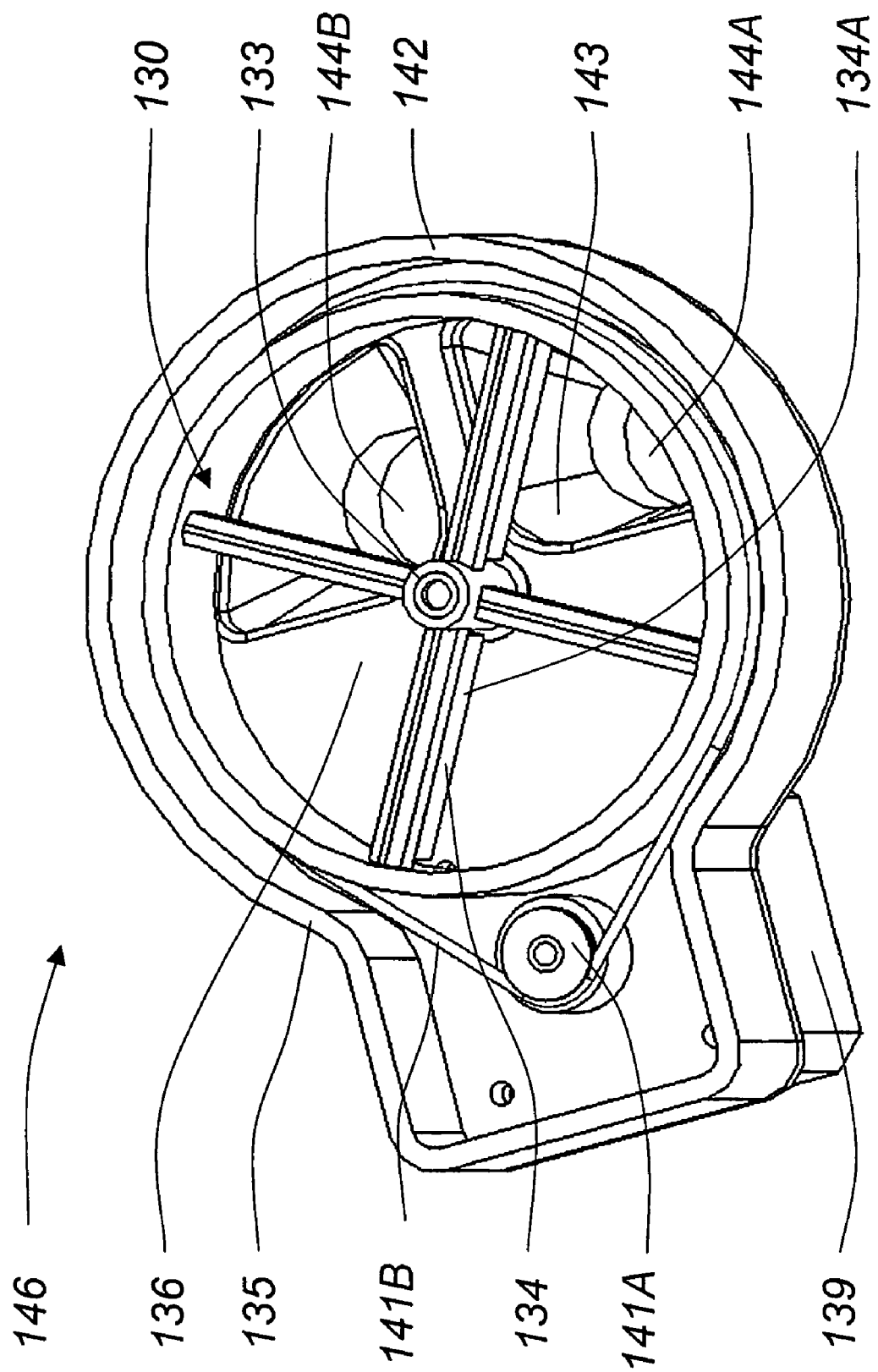
FIG. 10B is an isometric cross-section view of a feeder unit according to one exemplary embodiment having two apertures and discharge areas.

FIG. 10A illustrates an exemplary feeder unit 130 whose function it is to deliver a small batch of solid material to subsequent system based upon demand. Material enters the unit 130 via an adjustable throat 131 and flows into the inlet area 132. From there, the material flows into at least one of several compartments 132A formed by the rotary filler 133, paddles 134, outside walls 135, and the top side of the stationary plate 136. The paddles 134 may have a bottom portion 134A incorporating a flexible material, such as, but not limited to, a set of bristles or brushes, rubber, plastic or the like, to avoid jamming of material between the bottom edge of the paddle 134 and the trailing edge of the stationary plate aperture. These compartments 132A are sized to a volume commensurate with the amount of solid material that forms a single batch. The height of the material in each respective compartment 132A is effectively controlled by the relative height of the adjustable throat 131, thus allowing any necessary adjustment. To facilitate the adjustment and hold the adjustable throat 131 in position, an adjustment ring 137 may be utilized. This adjustment ring 137 pushes against the top of a cover 138 of the feeder unit 130. A cover 138 serves as the protection from outside contaminants. When material is demanded by downstream operations, the rotary filler 133 rotates around a pivot 139 carrying the paddles 134 as it spins. A feed motor 140 drives the rotary filler 133 by transferring power through a pulley 141A, and which in turn is connected to a belt 141B, which encircles the driven wheel 142, which is firmly attached to the rotary filler 133. Alternatively, a driving wheel 141 can be directly associated with the driven wheel 142. The driven wheel 142 can be spring loaded or pliable to be biased toward the driving wheel 141. The paddles 134 move the solid thermoplastic material around until it is positioned over the aperture 143 built into the stationary plate 136. Material from preferably one of the compartments 132A can then fall through the aperture 143 and flow down to the discharge area 144 of the feeder unit 130. Alternatively, the feed motor 140 can be a device which imparts rotary motion, such as, but not limited to, a motor or an indexer, such as an air cylinder with a ratcheting mechanism. FIG. 10B shows an exemplary embodiment of a feeder unit 146 wherein two discharge areas 144A, B incorporated, it being understood that a single discharge area or multiple (greater than two) discharge areas can possibly be used. In a double feeder configuration to feed one discharge, the motor turns clockwise allowing material to flow into the first aperture encountered. For the other discharge, the motor is commanded to turn counterclockwise.

Figure 11A:
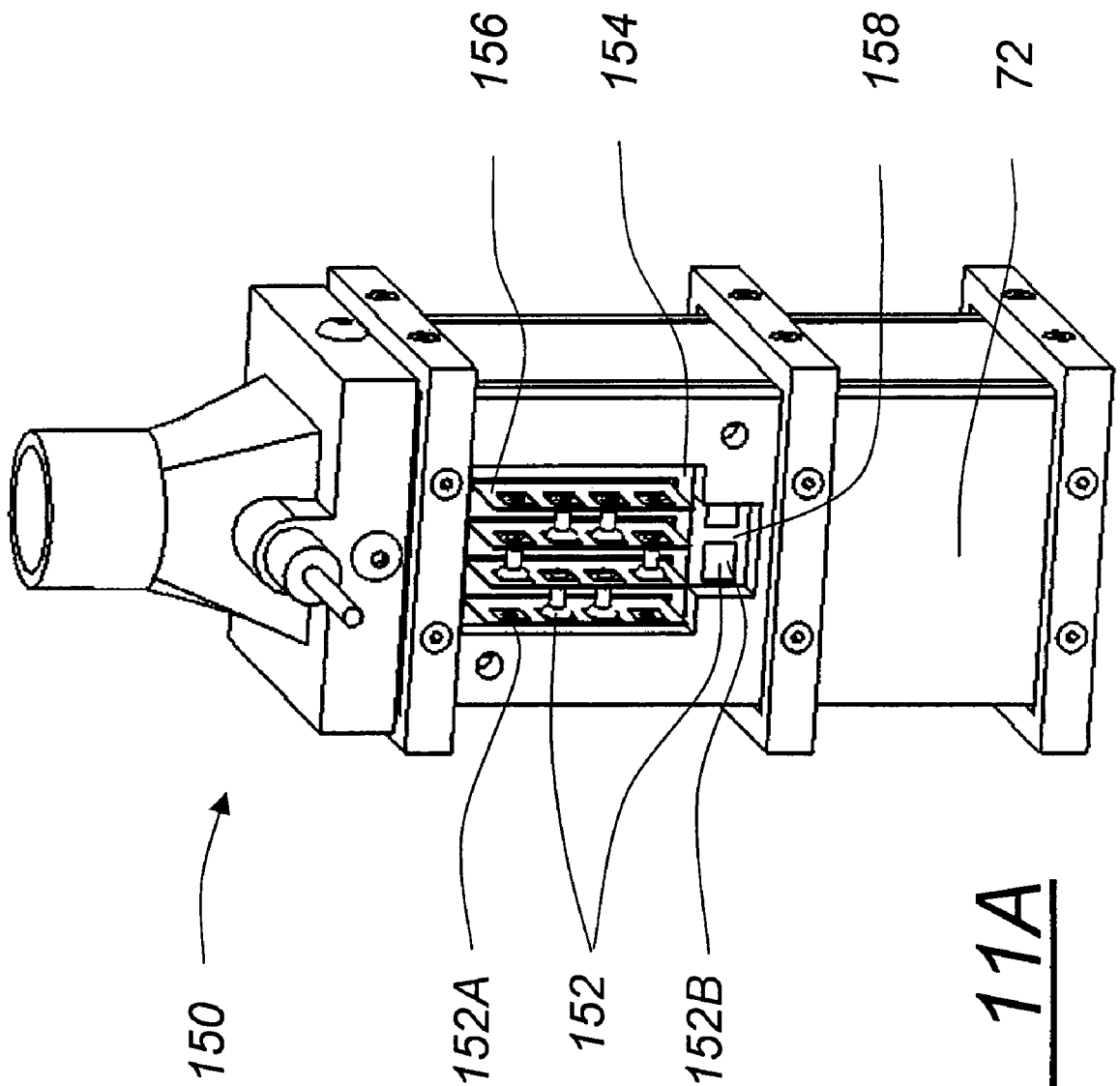
FIG. 11A is an isometric view in partial cutaway of a detail of the heat exchanger according to one exemplary embodiment showing the wiring.
Figure 11B:
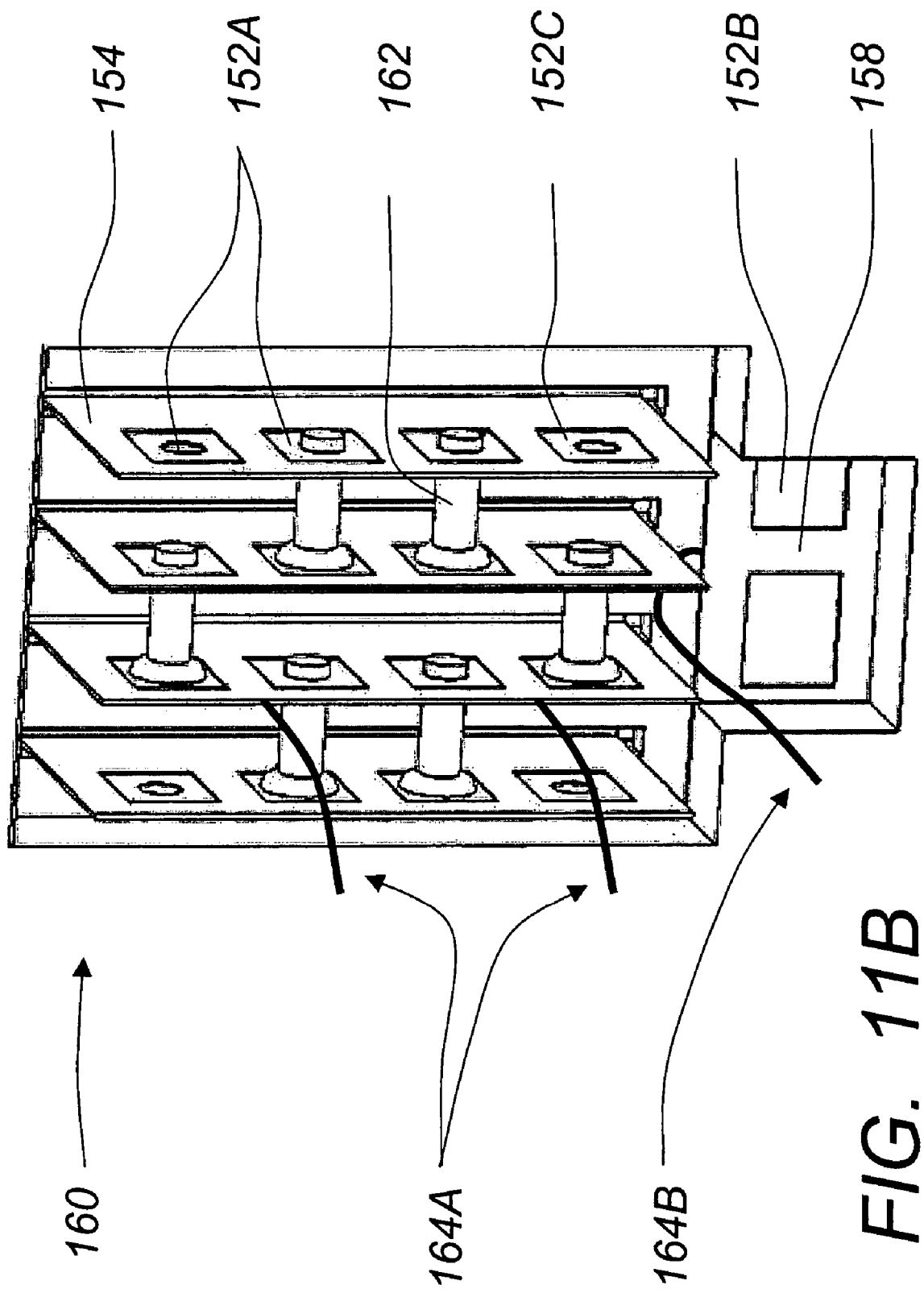
FIG. 11B is an isometric view of a detail of FIG. 11A.

FIG. 11A shows a detail view of the heat exchanger 62 plates and FIG. 11B shows a detail view of the wiring and connection. FIG. 11A shows a view of the heat exchanger 150 oriented to reveal the side where the main heater wiring terminations 152 are located. On this side, the enclosure insulation 72 features a cutout 154, which allows access to the said terminations. Through the cutout 154, special tabs 156 extend from all of the internal heater plates 73. On each of these tabs 156 are the heater plate's multiple wiring termination points 152A. Similarly, a portion of the enclosure heater 158 that is located on this side is exposed to allow access to its respective termination points 152B.

FIG. 11B show a close up 160 of the wiring terminations shown in FIG. 11A. Each heater plate features four heater termination points 152A, two for zone #1 and two for zone #2 (see FIG. 8) (this being an exemplary nonlimiting embodiment having two zones, it being understood that a different number of zones and termination points may be used with appropriate modifications). The heater plates zones are preferably wired in series, which is accomplished with jumpers 162 that interconnect adjacent heater plates. The remaining non-jumpered heater plate terminations 150C are then used for the external wiring connections. The four enclosure plates are also wired in series with the external wire connections 152B being accessible on the exposed portion of the depicted enclosure plate 158. Preferably, two thermocouple sensors 164A are housed within one of the centrally located heater plates with its leads extending outward. One of these thermocouples controls zone #1 and the other one controls zone #2. Similarly, a single thermocouple sensor 164A is housed within the enclosure plate and its leads extend from the exposed portion of the enclosure plate. It controls the only zone of the enclosure heaters. All wiring is subsequently directed towards a central control box.

Figure 12:
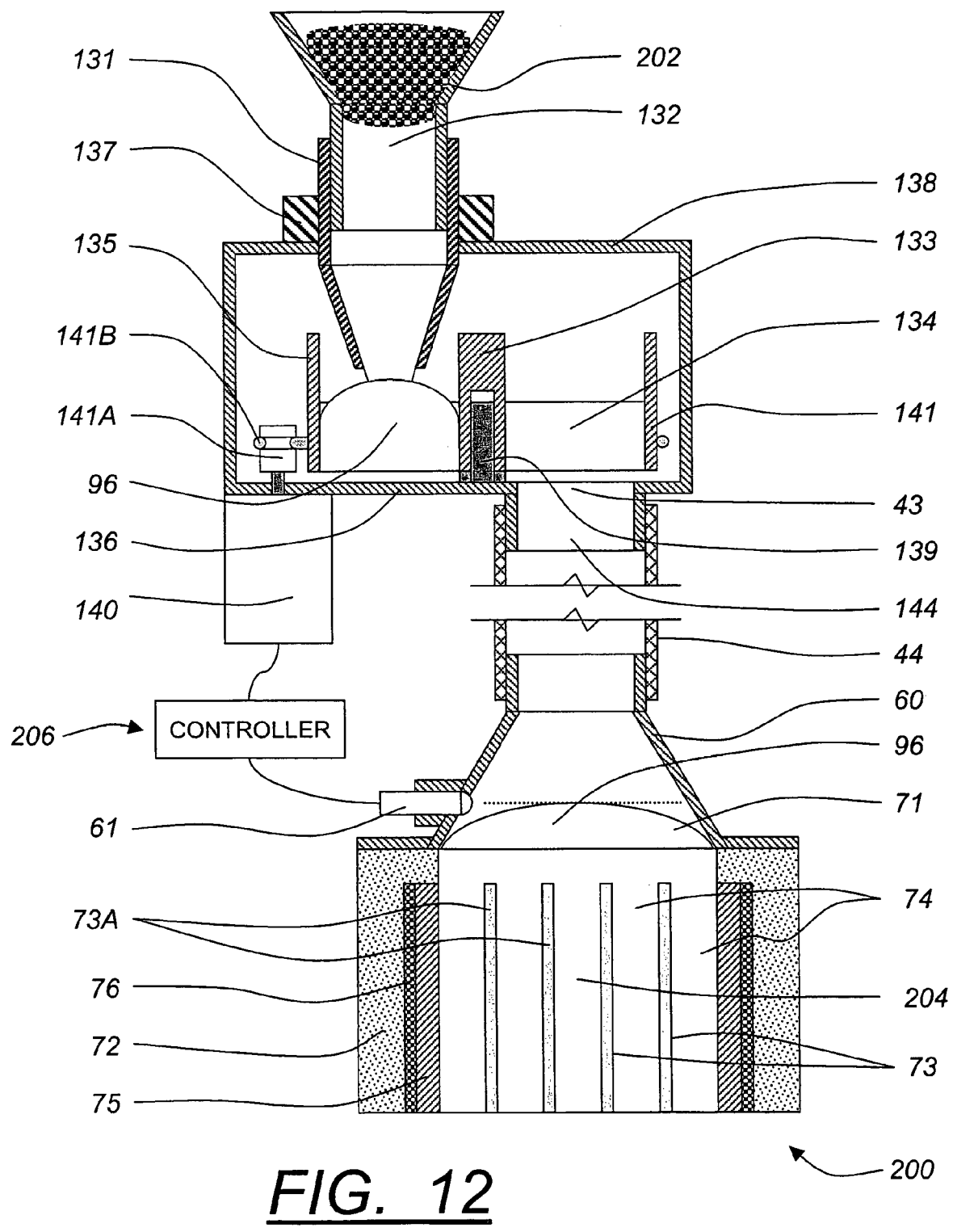
FIG. 12 is a cross-section view of a feeder apparatus according to one exemplary embodiment that includes the feeder unit and the melt unit.

FIG. 12 depicts an exemplary feeder apparatus 200 according to one exemplary embodiment of the present invention. Particulate material 202 enters the unit via the adjustable throat 131 and flows into the inlet area 132. From there, the material flows into one of several compartments 132A (not shown) formed by the rotary filler 133, paddles 134, outside walls 135, and the top side of the stationary plate 136. These compartments are sized to a volume commensurate with the amount of solid material that forms a single batch. The height of the material in each respective compartment is controlled by the relative height of the adjustable throat 131, thus allowing any necessary adjustment. To facilitate the adjustment and hold the adjustable throat 131 in position, an adjustment ring 137 is utilized. This adjustment ring 137 pushes against the top of the cover 138 of the feeder. The cover 138 serves as the protection from outside contaminants. When material is demanded by downstream operations, the rotary filler 133 rotates around the pivot 139 carrying the paddles 134 as it spins. A feed motor 140 ultimately drives the rotary filler 133 by transferring power through a driving pulley 141A, to a drive belt 141B, and then onto the driven wheel 142, which is firmly attached to the rotary filler 133. The paddles 134 move the solid thermoplastic material around until it is positioned over the aperture 143 built into the stationary plate 136. Material from one of the compartments can then fall through this opening and flow down to the discharge area 144 of the feeder unit. The material is transferred via the flexible feed hose 44 down to the cap 60. Material is then allowed to buildup in the accumulation section 71 up to a height that is sensed by the level sensor 61. This accumulation section 71 is defined by the inside walls of the cap 60 and thermal insulation 72, and the space above the heater plates 73. It is at this point solid particles of solid material wait to be funneled into the gaps 74 in between the heater plates 73 and the inside walls of the enclosure 75. The solid material flows downwards and is heated by the surfaces of the heater plates 73 and the inside wall of the enclosure 75. Each of these surfaces are composed of material with high thermal conductivity. On the outside walls of the enclosure 75 are thin enclosure heaters 76. Outside of these heaters 76 is the thermal insulation 72 to minimize the heat losses and provide protection from the hot metal surfaces and heaters. As the thermoplastic material reaches the lower ends 73B of the heater plates 73 (shown in FIGS. 5-6, but not shown in FIG. 12), the material is substantially molten and its temperature has been raised to the desired setpoint. Molten material 204 is collected at the collection point 77 at the bottom of the heat exchanger unit. A controller 206 receives the presence signal from the level sensor 61, processes it, and determines when the feed motor 140 should be activated. The controller 206 may contain a microprocessor 208 and memory storage means 208 (not shown) as is known to those skilled in the art.

An important aspect of the present invention is the ability to reduce the overall space envelope of the heat exchanger, pressurizing device, distribution manifold, and dispenser by integrating many functions and thus minimizing the number of required components. This enables the melting process to occur adjacent to the point of application, which minimizing the amount of adhesive that is heated at any one time and thus minimizes the time adhesive is at raised temperatures. This minimization of the adhesive residence time substantially reduces the possibility of material degradation, which is the greatest cause of system reliability problems. Fewer components which need to be heated reduces the potential burn hazards and greatly lowers the power consumption. By minimizing the mass of the heated components and the volume of molten adhesive, warm up times are much shorter. Furthermore, by simplifying the molten adhesive flow path and eliminating the need for flexible heated hoses, system capacitance is also eliminated and therefore fast system response times assure output accuracy in all conditions. Finally, by allowing the feeding of solid particulate material to the point of application, most adhesive storage is in the solid form. By constructing all particulate adhesive handling equipment out of transparent materials, operators can easily determine the status of the material supply by a quick observation From the above, it should be understood that the embodiments described, in regards to the drawings, are merely exemplary and that a person skilled in the art may make variations and modifications to the shown embodiments without departing from the spirit and scope of the invention. All such variations and modifications are intended to be included within the scope of the invention as defined by the appended claims. All applications, patents and documents and their disclosure referred to are incorporated herein in their entirety.

What is claimed is:

1. An apparatus for melting solid particulate material to melted material having a final application temperature suitable for immediate dispensing at an application site, comprising:
   a. a housing;
   b. an inlet associated with said housing for receiving material to be melted;
   c. a plurality of heater plates spaced closely together generally within said housing, each heater plate comprising
      i. an upper portion,
      ii. a lower portion,
      iii. at least one first layer comprising a thermally conductive and electrically insulative material,
      iv. at least one electrical resistance heater element operatively associated with said conductive material, said heater element extends substantially the length and width of said heater plate and maintains substantially the entire exterior surface of said heater plate at substantially the same temperature while either said solid particulate material, said melted material, partially melted material or a mixture of solid, partially melted and melted material passes from said upper portion to said lower portion at a wide range of flow rate and targeted application temperature conditions, and
      v. at least one second layer comprising a thermally conductive and electrically insulative material,
   whereby said at least one electrical resistance heater element is substantially disposed between said first and second layers of thermally conductive and electrically insulative material, whereby said heater plates raise the temperature of said melted material to a final recommended temperature suitable for immediate dispensing at said application site.

2. The apparatus of claim 1, further comprising an outlet for dispensing melted material proximate to said application site.

3. The apparatus of claim 1, wherein said first and second layers of said heater plate are generally flat and are substantially parallel to each other.

4. The heater element of claim 1, wherein said heater plate further comprises a layer of thermally conductive material laminated to both sides of said electrically insulating material.

5. The apparatus of claim 1, wherein said heater plate is coated with a nonstick coating.

6. The apparatus of claim 1, wherein each said heater plate further comprises a means for attaching said plate to said housing.

7. The apparatus of claim 6, wherein said attaching means comprises at least one slot associated with said housing into which said plate can be inserted and maintained.

8. The apparatus of claim 1, wherein the space between two adjacent heater plates is between about 0.1 and 0.4 inches.

9. The apparatus of claim 1, wherein said plurality of heater plates are arranged in a generally parallel orientation.

10. The apparatus of claim 1, wherein each said heater plate has a first face and a second face, said first and second faces being substantially parallel to each other and wherein said plurality of heater plates have a top end and a bottom end and are arranged in a generally radial fan orientation wherein the spacing between said heater plates decreases in the direction of flow of said material from said top end of said heater plate toward said bottom end of said heater plate.

11. The apparatus of claim 1, wherein each of said heater plates has a first outer surface and a second outer surface which are substantially parallel to each other.

12. The apparatus of claim 1, wherein said plurality of heater plates consist of two sets of intersecting sets of plates arranged in two directions so as to form a grid pattern.

13. The apparatus of claim 1, wherein each said heater plate has a thickness of less than or equal to about 0.2 inches.

14. The apparatus of claim 1, wherein each said heater plate has a thickness of about 0.04 inches.

15. The apparatus of claim 1, wherein each said heater plate has a wattage density which varies commensurate with the heat transfer demand load based on the temperature differential of said material flowing through said heater plate.

16. The apparatus of claim 1, further comprising at least one temperature sensor associated with each of said plurality of heater plates and responsive to material load conditions so as to send a signal to a heater element control to adjust wattage as necessary to maintain the surface of said heater plate at a substantially constant temperature while said material flows within said heater plate.

17. The apparatus of claim 1, wherein said at least one heater element is divided into at least two temperature control zones.

18. The apparatus of claim 1, further comprising a sensor for detecting the presence and/or quantity of unmelted material proximate to said inlet.

19. The apparatus of claim 18, wherein sensor comprises a presence-sensing device.

20. The apparatus of claim 1, wherein said at least one heater element is divided into at least one temperature control zone.

21. The apparatus of claim 20, wherein said at least one heater element wattage density varies with the heat transfer demand load along the direction of flow of said material from said upper portion to said lower portion.

22. The apparatus of claim 20, wherein the relationship between the wattage densities versus the distance along said plate is non-linear along the direction of flow of said material from said upper portion to said lower portion.

23. The apparatus of claim 22, wherein said relationship between the wattage densities versus the distance along said plate in the direction of said material flow follows the formula $C(1-e^{-t/\tau})$, where C is a constant, t is time (proportional to the distance along the plate path) and $\tau$ is a time constant.

24. The apparatus of claim 20, wherein said wattage density varies in a generally smooth gradient along said heater plate in the direction of said material flow.

25. The apparatus of claim 20, wherein said wattage density varies as a generally step function along said heater plate in the direction of said material flow.

26. The apparatus of claim 1, wherein said outlet includes a bottom having slope to promote drainage of said flowable thermoplastic material.

27. The apparatus of claim 1, further comprising a pump and a nozzle, whereby said plurality of heater plates raise the temperature of said melted material to a final recommended temperature to be used at said application site and said pump increases the pressure of said melted material and said nozzle delivers melted material proximate to said application site.

28. The apparatus of claim 27, further comprising a valve disposed between said pump and said nozzle.

* * * * *